(12) United States Patent
Ovsiannikov

(10) Patent No.: US 7,876,363 B2
(45) Date of Patent: Jan. 25, 2011

(54) METHODS, SYSTEMS AND APPARATUSES FOR HIGH-QUALITY GREEN IMBALANCE COMPENSATION IN IMAGES

(75) Inventor: Ilia Ovsiannikov, Studio City, CA (US)

(73) Assignee: Aptina Imaging Corporation, George Town (KY)

( * ) Notice: Subject to any disclaimer, the term of this patent is extended or adjusted under 35 U.S.C. 154(b) by 950 days.

(21) Appl. No.: 11/785,706

(22) Filed: Apr. 19, 2007

(65) Prior Publication Data

US 2008/0259180 A1    Oct. 23, 2008

(51) Int. Cl.
H04N 9/73    (2006.01)
(52) U.S. Cl. .................................. 348/223.1; 348/231.3
(58) Field of Classification Search .............. 348/222.1, 348/223.1, 231.3, 241
See application file for complete search history.

(56) References Cited

U.S. PATENT DOCUMENTS

| | | | |
|---|---|---|---|
| 6,933,971 | B2 | 8/2005 | Bezryadin |
| 2002/0122589 | A1 | 9/2002 | Reiman et al. |
| 2002/0154813 | A1 | 10/2002 | Stevenson et al. |
| 2004/0052414 | A1 | 3/2004 | Schroder |
| 2006/0013479 | A1 | 1/2006 | Trimeche et al. |
| 2006/0098868 | A1 * | 5/2006 | Fainstain et al. ............ 382/167 |
| 2006/0239549 | A1 | 10/2006 | Kelly et al. |
| 2006/0245016 | A1 | 11/2006 | Fukao et al. |
| 2006/0250623 | A1 | 11/2006 | Newman et al. |
| 2006/0257022 | A1 | 11/2006 | Hayaishi |
| 2007/0003136 | A1 | 1/2007 | Shimbaru |
| 2008/0252759 | A1 * | 10/2008 | Jerdev et al. ................ 348/273 |

FOREIGN PATENT DOCUMENTS

| | | |
|---|---|---|
| WO | WO 99/39509 | 8/1999 |
| WO | WO 03/085963 A1 | 10/2003 |
| WO | WO 2007/032824 A2 | 3/2007 |
| WO | WO 2007/054931 A2 | 5/2007 |

OTHER PUBLICATIONS

Heimann, et al., "Color Filter Array and Color Correction for High Dynamic Range CMOS Image Sensors," European Conference on Circuit Theory and Design, Aug. 28-31, 2001.
Li, et al., "Modelling of Color Cross-Talk in CMOS Image Sensors," IEEE, 2002, IV 3576-3579.
Li, et al., "CMOS Sensor Cross-Talk Compensation for Digital Cameras," IEEE Transactions on Consumer Electronics, vol. 48, No. 2, May 2002, pp. 292-297.
Agranov, et al., "Crosstalk and Microlens Study in a Color CMOS Image Sensor," IEEE Transactions on Electron Devices, vol. 50, No. 1, Jan. 2001, pp. 4-11.
Henker, et al., "Concept of Color Correction on Multi-Channel CMOS Sensors," Proc. VIIth Digital Image Computing : Techniques and Application, Dec. 10-12, 2003, Sydney.
McCleary, et al., "Cross-talk correction methodology for color CMOS imagers," SPIE-IS&T/vol. 5678, pp. 117-128, 2005.
International Search Report dated Jul. 18, 2008.

* cited by examiner

Primary Examiner—Gevell Selby

(57) ABSTRACT

Methods, systems and apparatuses for determining and compensating for green imbalance in imagers. An estimated local green balance correction term is limited, e.g., between an upper and lower limit. The upper and lower limits are determined from a set of parameters. The parameters are determined during a calibration procedure. The parameters may be stored for a subset of possible pixel locations and parameters for each pixel not at a location corresponding to stored data may be determined by interpolation.

25 Claims, 11 Drawing Sheets

| $G_{1,1}$ | $R_{1,2}$ | $G_{1,3}$ | $R_{1,4}$ | $G_{1,5}$ | $R_{1,6}$ | $G_{1,7}$ | $R_{1,8}$ | $G_{1,9}$ | $R_{1,10}$ |
|---|---|---|---|---|---|---|---|---|---|
| $B_{2,1}$ | $G_{2,2}$ | $B_{2,3}$ | $G_{2,4}$ | $B_{2,5}$ | $G_{2,6}$ | $B_{2,7}$ | $G_{2,8}$ | $B_{2,9}$ | $G_{2,10}$ |
| $G_{3,1}$ | $R_{3,2}$ | $G_{3,3}$ | $R_{3,4}$ | $G_{3,5}$ | $R_{3,6}$ | $G_{3,7}$ | $R_{3,8}$ | $G_{3,9}$ | $R_{3,10}$ |
| $B_{4,1}$ | $G_{4,2}$ | $B_{4,3}$ | $G_{4,4}$ | $B_{4,5}$ | $G_{4,6}$ | $B_{4,7}$ | $G_{4,8}$ | $B_{4,9}$ | $G_{4,10}$ |
| $G_{5,1}$ | $R_{5,2}$ | $G_{5,3}$ | $R_{5,4}$ | $G_{5,5}$ | $R_{5,6}$ | $G_{5,7}$ | $R_{5,8}$ | $G_{5,9}$ | $R_{5,10}$ |
| $B_{6,1}$ | $G_{6,2}$ | $B_{6,3}$ | $G_{6,4}$ | $B_{6,5}$ | $G_{6,6}$ | $B_{6,7}$ | $G_{6,8}$ | $B_{6,9}$ | $G_{6,10}$ |
| $G_{7,1}$ | $R_{7,2}$ | $G_{7,3}$ | $R_{7,4}$ | $G_{7,5}$ | $R_{7,6}$ | $G_{7,7}$ | $R_{7,8}$ | $G_{7,9}$ | $R_{7,10}$ |
| $B_{8,1}$ | $G_{8,2}$ | $B_{8,3}$ | $G_{8,4}$ | $B_{8,5}$ | $G_{8,6}$ | $B_{8,7}$ | $G_{8,8}$ | $B_{8,9}$ | $G_{8,10}$ |
| $G_{9,1}$ | $R_{9,2}$ | $G_{9,3}$ | $R_{9,4}$ | $G_{9,5}$ | $R_{9,6}$ | $G_{9,7}$ | $R_{9,8}$ | $G_{9,9}$ | $R_{9,10}$ |
| $B_{10,1}$ | $G_{10,2}$ | $B_{10,3}$ | $G_{10,4}$ | $B_{10,5}$ | $G_{10,6}$ | $B_{10,7}$ | $G_{10,8}$ | $B_{10,9}$ | $G_{10,10}$ |

FIG. 1

METHODS, SYSTEMS AND APPARATUSES FOR HIGH-QUALITY GREEN IMBALANCE COMPENSATION IN IMAGES

FIELD OF THE INVENTION

Embodiments of the invention relate to methods, systems and apparatuses for green imbalance compensation in imagers.

BACKGROUND OF THE INVENTION

Imagers, such as for example charge coupled devices (CCD), complementary metal oxide semiconductor (CMOS) and others, are widely used in imaging applications including digital still and video cameras. A CMOS imager circuit includes a focal plane array of pixels, each one of the pixels including a photosensor, for example, a photogate, a photoconductor, a phototransistor or a photodiode for accumulating photo-generated charge in the specified portion of the substrate. Each pixel has a charge storage region, formed on or in the substrate, which is connected to the gate of an output transistor that is part of a readout circuit. The charge storage region may be constructed as a floating diffusion region. In some imager circuits, each pixel may include at least one electronic device such as a transistor for transferring charge from the photosensor to the storage region and one device, also typically a transistor, for resetting the storage region to a predetermined charge level prior to charge transference.

In a CMOS imager, the active elements of a pixel perform the functions of: (1) photon to charge conversion; (2) accumulation of image charge; (3) resetting the storage region to a known state; (4) transfer of charge to the storage region; (5) selection of a pixel for readout; and (6) output and amplification of signals representing pixel reset level and pixel charge. Photo charge may be amplified when it moves from the initial charge accumulation region to the storage region. The charge at the storage region is typically converted to a pixel output voltage by a source follower output transistor.

Exemplary CMOS imaging circuits, processing steps thereof, and detailed descriptions of the functions of various CMOS elements of an imaging circuit are described, for example, in U.S. Pat. Nos. 6,140,630; 6,204,524; 6,310,366; 6,326,652; 6,333,205; 6,376,868; 6,852,591, all of which are assigned to Micron Technology, Inc. The disclosures of each of the foregoing are hereby incorporated by reference herein in their entirety.

CMOS imagers typically have an array of pixels containing photosensors, where each pixel produces a signal corresponding to the intensity of light impinging on that element when an image is focused on the pixel array. The signals may then be digitized and stored, for example, for display of a corresponding image on a monitor or for providing hardcopy images or otherwise used to provide information about a captured image. The magnitude of the signal produced by each pixel is proportional to the intensity of light impinging on the respective photosensor.

For photosensors to capture a color image, they must be able to separately detect color components of a captured image. For example when using a Bayer pattern, as shown for example in FIG. 1, photons having a wavelength corresponding to a red, green or blue color are detected by respective red, green, and blue pixels (i.e., each pixel is sensitive only to one color or spectral band). For this to occur, a color filter array (CFA) is typically placed in front of the pixel array so that each pixel receives the light of the color of its associated filter according to a specific pattern, e.g., the Bayer pattern 10 of FIG. 1. Other color filter array patterns are also known in the art and are applicable as well.

As shown in FIG. 1, the Bayer pattern 10 is an array of repeating red (R), green (G), and blue (B) filters. A red pixel is a pixel covered by a red filter; similarly, a blue pixel or a green pixel is a pixel covered by a blue or a green filter, respectively. The pixels of FIG. 1 may be identified by coordinates, $p_{i,j}$, to identify the color and the location of the pixel within the pixel array, where p indicates the color (R for red, B for blue, G for green), i indicates the row location, and j indicates the column location. For example, one row 15 includes a green pixel $G_{1,1}$ in column one and a red pixel $R_{1,2}$ in column two. Likewise, a next row 20 includes a blue pixel $B_{2,1}$ in column one and a green pixel $G_{2,2}$ in column two.

In the Bayer pattern 10, red pixels 11, green pixels 13 and blue pixels 12 are arranged so that alternating red 11 and green 13 pixels are in one row 15 of a pixel array, and alternating blue 12 and green 13 pixels are in a next row 20. These alternating rows 15, 20 are repeated throughout the pixel array. Thus, when the imager is read out, the pixel sequence for one row (i.e., row 15) reads GRGRGR, etc., and the sequence for the next row (i.e., row 20) reads BGBGBG, etc. While FIG. 1 depicts an array having only ten rows and ten columns, pixel arrays typically have hundreds or thousands of rows and columns of pixels.

Pixels of a pixel array may experience interference, or crosstalk, when neighboring pixels interfere with each other. One form of such interference is optical crosstalk. Other forms of such interference include electrical crosstalk. Crosstalk may cause different problems in a captured image, one of which is a phenomenon known as green imbalance, which is when the pixels in one green channel of a pixel array provide a different output signal than the pixels in the other green channel of the pixel array under the same illumination level.

An example of optical crosstalk is described with reference to FIG. 2. FIG. 2 illustrates a portion of a color filter array 35 having the Bayer pattern 10 in front of a portion of pixels 40 of a pixel array. For pixels 40 located, for example, on the periphery of the pixel array, light rays 30 from a lens, e.g. a camera lens, may be coming in at oblique angles. In FIG. 2, for example, the illumination in the red spectrum which passes through red filter 36 at an oblique angle substantially affects the response of the green pixel 43. This is because the light rays 30 are coming in at such an angle that the light passing through red filter 36 actually hits the green pixel 43 instead of the red pixel for which it is intended. The same type of effect would also occur for green pixels that are located adjacent to blue pixels. The magnitude of the affect of optical crosstalk on a specific pixel is a function of several factors, including, for example, the distance between the pixel and its neighboring pixels and the distance between a photo sensor and an overlying microlens. Optical crosstalk may affect pixels throughout the pixel array and is not limited in its effect to pixels located at the periphery. However, the magnitude of the interference will depend on the angle of incidence of the light rays and therefore will vary throughout a pixel array depending on the location of the pixel within the pixel array.

Electrical crosstalk occurs when electrical charge generated in the photo sensor of one pixel travels to be collected at or otherwise influences the signal of an adjacent pixel. Such crosstalk causes interferences between signals converted via the photo detecting device.

The crosstalk interference of the red and blue pixels with the green neighboring pixels may cause the green-red pixels and the green-blue pixels to appear differently, even in response to the same level of light stimulus. This occurrence is known as green imbalance. Green-red pixels are the green pixels which appear in the same rows as red pixels, e.g., row 15 of FIG. 1. Green-blue pixels are the green pixels which appear in the same rows as blue pixels, e.g., row 20 of FIG. 1. The greed-red and green-blue pixels appear differently because the blue pixels will have a different affect on the green-blue pixels than the red pixels will have on the green-red pixels. In turn, this causes the pixels of the two green channels to have different crosstalk effects.

The presence of green imbalance can degrade image quality unless special steps are taken to counteract that effect during image processing. An image captured of an evenly illuminated white field, for example, may result in responses of the green-red pixels being different than the green-blue pixels. If this effect is not corrected during image processing, the variation in response may show up as a fine checkerboard pattern overlaid on a captured image or as other forms of image artifacts. Therefore, this imbalance between the green-blue and the green-red pixels should be desirably corrected during image processing. Ideally, the crosstalk components of the green-blue and green-red pixel signals are normalized after green imbalance compensation, at which point any effect of crosstalk will no longer be apparent in the displayed image.

Various computational methods are known to exist to compensate for green imbalance, including methods utilizing local neighborhood operations. Existing local green balancing methods improve image quality, but may also yield abundant undesirable image artifacts. Accordingly, a method that delivers high-quality results for green imbalance compensation without adding undesirable artifacts is desired.

BRIEF DESCRIPTION OF THE DRAWINGS

FIG. 1 shows a Bayer color filter pattern.

DETAILED DESCRIPTION OF THE INVENTION

Figure 2:
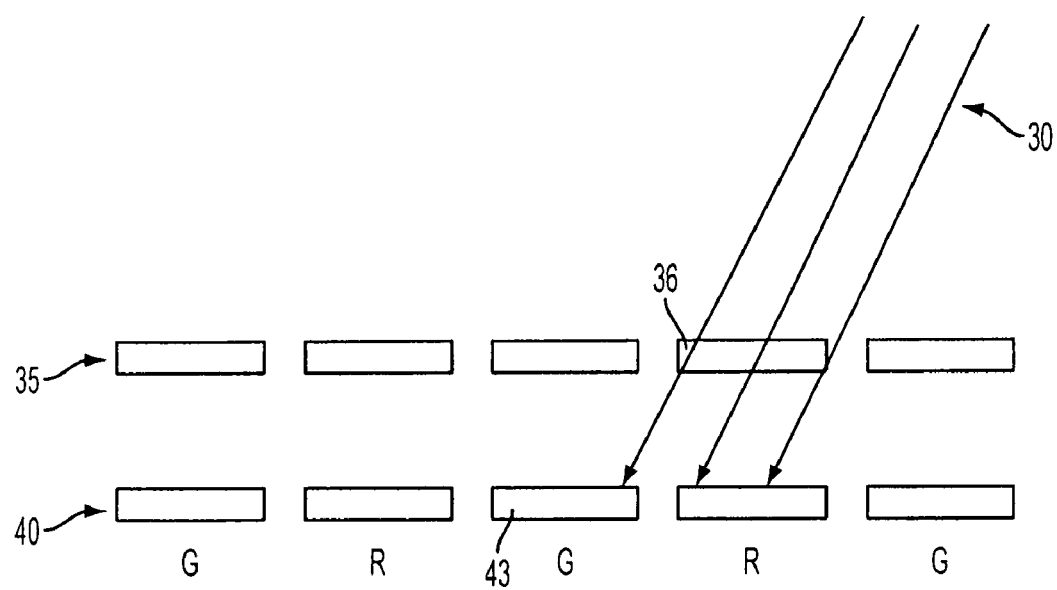
FIG. 2 shows an example of optical crosstalk.

In the following detailed description, reference is made to the accompanying drawings which form a part hereof, and in which are shown by way of illustration specific embodiments of the invention. These embodiments are described in sufficient detail to enable those skilled in the art to make and use them, and it is to be understood that structural, logical or procedural changes may be made. Particularly, in the description below, processing is described by way of flowchart. In some instances, steps which follow other steps may be in reverse, in a different sequence, or may occur simultaneously, except where a following procedural step requires the presence of a prior procedural step. The processes illustrated in the flowcharts can be implemented as a pixel processing pipeline circuit provided in an image processor of a solid state imager device. The pixel processing pipeline circuit can be implemented using hardware components including an ASIC, a processor executing a program, or other signal processing hardware and/or processor structures or any combination thereof.

In the following description, the embodiments are described in relation to a CMOS image sensor for convenience purposes only; the disclosed embodiments, however, have wider applicability to green imbalance compensation for pixel output signals in any image sensor, including CCD imagers.

As noted, conventional technologies are known for compensating for green imbalance in an imager. As previously described, FIG. 1 shows a portion of a pixel array having a Bayer color filter pattern 10. In general, during green imbalance compensation in one known technique, for each pixel, $p_{i,j}$, in the array that has a green color filter (e.g., $G_{i,j}$), local green balancing algorithms calculate a local green balance correction term, $\Delta_{i,j}$. The green balance correction term may take into account optical and/or electrical crosstalk. The green pixel signals are adjusted by applying this green balance correction term to the pixel response signal, thereby compensating for the crosstalk effect and correcting a captured image. One example of an implementation of a local green balancing method is disclosed in copending application Ser. No. 11/783,865, entitled METHOD, APPARATUS AND SYSTEM PROVIDING GREEN-GREEN IMBALANCE COMPENSATION, filed Apr. 12, 2007 ("the '865 application") the entire disclosure of which is incorporated herein by reference.

One possible method for calculating the local green balance correction term, $\Delta_{i,j}$, for a particular pixel, $p_{i,j}$, is now described. This method is described in more detail in the '865 application. In general, local green balancing methods determine a correction term based on an average of the pixel signal values for the surrounding green pixels. The surrounding green pixels may be in the form of a pixel kernel 25 of size M by N, shown as a 5×5 pixel kernel, for example, in FIG. 1. The correction term for a pixel in the center of pixel kernel 25 (e.g., $G_{3,3}$ in FIG. 1) is calculated as shown in Equations (1) through (3):

$$S_{G1} = \frac{G_{1,1} + G_{1,3} + G_{1,5} + G_{3,1} + G_{3,3} + G_{3,5} + G_{5,1} + G_{5,3} + G_{5,5}}{9}; \quad (1)$$

$$S_{G2} = \frac{G_{2,2} + G_{2,4} + G_{4,2} + G_{4,4}}{4}; \text{ and} \quad (2)$$

$$\Delta_{i,j} = \frac{S_{G1} - S_{G2}}{2}. \quad (3)$$

As can be seen in Equations (1) through (3), two averages are first calculated. $S_{G1}$ is the average of pixel signals ($G_{i,j}$) that are local (e.g., within the same M by N pixel kernel) and belong to the same green color channel as the pixel being corrected (e.g., all green-red pixels in FIG. 1). $S_{G2}$ is the average of pixel signals that are local and belong to the other green color channel as the pixel being corrected (e.g., all green-blue pixels in FIG. 1).

The corrected pixel signal for a given green pixel located at the center of the pixel kernel 25 may then be calculated as in one of Equations (4), (5) or (6), depending on the relationship between the two calculated averages, $S_{G1}$ and $S_{G2}$:

$$\text{If } S_{G1} > S_{G2}, \text{ then } p'_{i,j} = p_{i,j} - |\Delta_{i,j}|; \text{ or} \quad (4)$$

$$\text{If } S_{G1} < S_{G2}, \text{ then } p'_{i,j} = p_{i,j} + |\Delta_{i,j}|; \text{ or} \quad (5)$$

$$\text{If, } S_{G1} = S_{G2}, \text{ then } p'_{i,j} = p_{i,j}, \quad (6)$$

where $p'_{i,j}$ represents the corrected pixel signal, $p_{i,j}$ represents the pixel signal from the imager pixel array and $\Delta_{i,j}$ is the correction term calculated in accordance with Equation (3). The correction term may be calculated in this manner for each pixel in the pixel array using the corresponding pixel kernel of which the pixel being corrected is at the center, such as pixel kernel 25 is used for pixel $G_{3,3}$. Thus, as pixel kernel 25 moves across and down a pixel array, green pixels at the center of the pixel kernel 25 are corrected.

It should be understood that this method is but one example of a local green imbalance compensation method. This type of estimation method for local green imbalance compensation works well in areas of an image that are uniform. However, the presence of sharp, high color-contrast edges may introduce large errors in the estimated correction term, $\Delta_{i,j}$. These errors become apparent in the corrected image as zipper effects or color fringe around the high-contrast edges. Other types of image artifacts may also occur while using this type of method for local green imbalance estimation and correction.

Disclosed embodiments improve upon this type of average-based local green imbalance compensation method by limiting the correction term, $\Delta_{i,j}$, within predetermined limits in order to minimize unwanted image artifacts. Requiring the correction term to fall within the predetermined limits (determined during imager pixel array and/or camera calibration), reduces the effect of high-contrast edges on the local green imbalance correction algorithm. Disclosed embodiments of limiting the green balance correction term may also be implemented using other methods of calculating the green balance correction term, $\Delta_{i,j}$, than those described herein.

According to disclosed embodiments, the estimated local green balance correction term, $\Delta_{i,j}$, is limited as shown in the following Equations (7) through (9):

$$\Delta'_{i,j} = a_{pos} * p_{i,j} + b_{pos} \text{ when } \Delta_{i,j} > a_{pos} * p_{i,j} + b_{pos}; \quad (7)$$

$$\Delta'_{i,j} = a_{neg} * p_{i,j} + b_{neg} \text{ when } \Delta_{i,j} < a_{neg} * p_{i,j} + b_{neg}; \text{ and} \quad (8)$$

$$\Delta'_{i,j} = \Delta_{i,j} \text{ when } a_{neg} * p_{i,j} + b_{neg} \leq \Delta_{i,j} \leq a_{pos} * p_{i,j} + b_{pos}, \quad (9)$$

where $\Delta_{i,j}$ represents the estimated local green balance correction term (determined from any available green imbalance compensation method, such as that previously discussed), $\Delta'_{i,j}$ represents the limited green balance correction term, and $a_{neg}$, $b_{neg}$, $a_{pos}$, and $b_{pos}$ are constants. The constants depend on various properties of the pixel being corrected and on the sensor and camera optics by which the image is captured. The constants are determined during imager and/or camera calibration, discussed in more detail below. It should be noted that the correction term is limited to be between the upper and lower limits, as shown in Equation (10):

$$\Delta_{neg\_i,j} = a_{neg} * b_{neg} \leq \Delta'_{i,j} \leq a_{pos} * p_{i,j} + b_{pos} = \Delta_{pos\_i,j}, \quad (10)$$

where $\Delta_{neg\_i,j}$ is the negative limit and $\Delta_{pos\_i,j}$ is the positive limit on the green balance correction term. The positive and negative limits, $\Delta_{pos\_i,j}$ and $\Delta_{neg\_i,j}$, respectively, are derived from the calculated parameters determined during imager pixel array and/or camera calibration.

When the estimated local green balance correction term, $\Delta_{i,j}$, is outside of these limits, $\Delta_{pos\_i,j}$ and $\Delta_{neg\_i,j}$, the limits are applied to determine a limited correction term, $\Delta'_{i,j}$. If the estimated local green balance correction term already satisfies the relationship of Equation (10) (e.g., $\Delta_{i,j}$ is already between the limits $\Delta_{pos\_i,j}$ and $\Delta_{neg\_i,j}$), then no limiting of the correction term is needed and the limited green balance correction term is equal to the estimated local green balance correction term. Disclosed embodiments then substitute the limited green balance correction term, $\Delta'_{i,j}$, for the estimated local green balance correction term, $\Delta_{i,j}$, when using Equations (4) and (5) to calculate the corrected pixel signal and complete green imbalance compensation. The limited green balance correction term, $\Delta'_{i,j}$, is calculated in this manner for all green pixels of the pixel array.

The correction term limits, $\Delta_{pos\_i,j}$ and $\Delta_{neg\_i,j}$, applied in Equation (10) are derived as follows. In general, the amount of pixel crosstalk is a function of exposure and spectral reflectance of the object. In particular, the optical crosstalk is typically a linear function of exposure, which in turn is linearly related to pixel response. Thus, assuming the optical crosstalk component substantially dominates the electrical crosstalk component, the pixel crosstalk is a linear function of pixel response. As previously discussed, green imbalance may be caused by optical or electrical crosstalk among pixels. A camera imaging a white flat field illuminated by a light source having a certain spectral characteristic results in a pixel response that is linear, regardless of the spectral characteristic (S). The pixel response can be thought of as a sum of two components—exposure without crosstalk and inter-pixel crosstalk. By pixel array design, the non-crosstalk component is linear with respect to exposure. If crosstalk takes place, the amount of the color crosstalk component therefore should also be a linear function of exposure. The slope of the crosstalk component ($a_{neg}$, $a_{pos}$) depends on the particular choice of the spectral characteristic of the illuminant and the spectral reflectance of the object being imaged. Thus, in any real scene, the amount of green imbalance is a linear function of exposure with the slope depending on the spectrum of the light reflected from the object being imaged.

Figure 3:
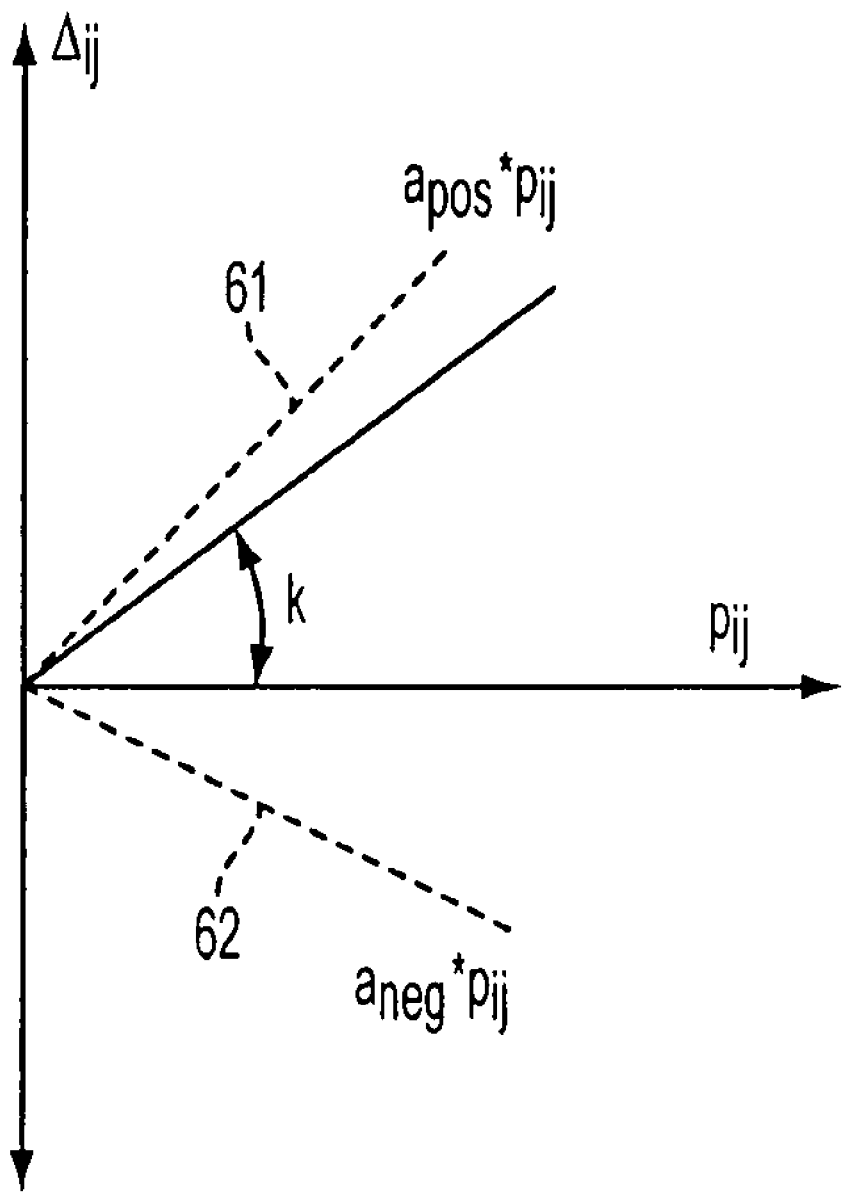
FIG. 3 is a graph showing pixel response versus correction term limits for green imbalance compensation.

As seen in FIG. 3, for a given pixel, a maximum positive limit 61, $a_{pos} * p_{i,j}$, and a maximum negative limit 62, $a_{neg} * p_{i,j}$, can be found such that all dependencies $\Delta_{i,j} = f(p_{i,j})$ comply with $a_{neg} * p_{i,j} \leq \Delta_{i,j} \leq a_{pos} * p_{i,j}$ for all spectra of light reflected from the imaged object. In theory, these limits improve the green imbalance adjustment. However, in a practical application, the pixel response may not exactly be a linear function of exposure. Thus, a somewhat more general formula, as shown in Equation (10) above, that includes offsets ($b_{neg}$, $b_{pos}$) chosen to account for possible small non-linearities is used.

Parameters $a_{neg}$, $b_{neg}$, $a_{pos}$, and $b_{pos}$ are determined during a calibration process for an imager pixel array or for a camera using the array. This can be done either experimentally or using a simulation. The amount of pixel crosstalk affecting pixels in a given imager array may or may not depend on the location of the specific pixel within the pixel array. For example, a pixel array may only experience electrical crosstalk, which would not be a function of pixel location within the array. If pixel crosstalk is not a function of pixel location in the pixel array, a single set of parameters ($a_{neg}$, $b_{neg}$, $a_{pos}$, and $b_{pos}$) is determined. If pixel crosstalk is a function of pixel location in the pixel array, a plurality of sets of parameters, one for each pixel location ($a_{neg\_i,j}$, $b_{neg\_i,j}$, $a_{pos\_i,j}$, and $b_{pos\_i,j}$), are determined. More often than not, pixel crosstalk is a function of the location of the pixel within the pixel array, so a plurality of sets of parameters are used.

Figure 4:
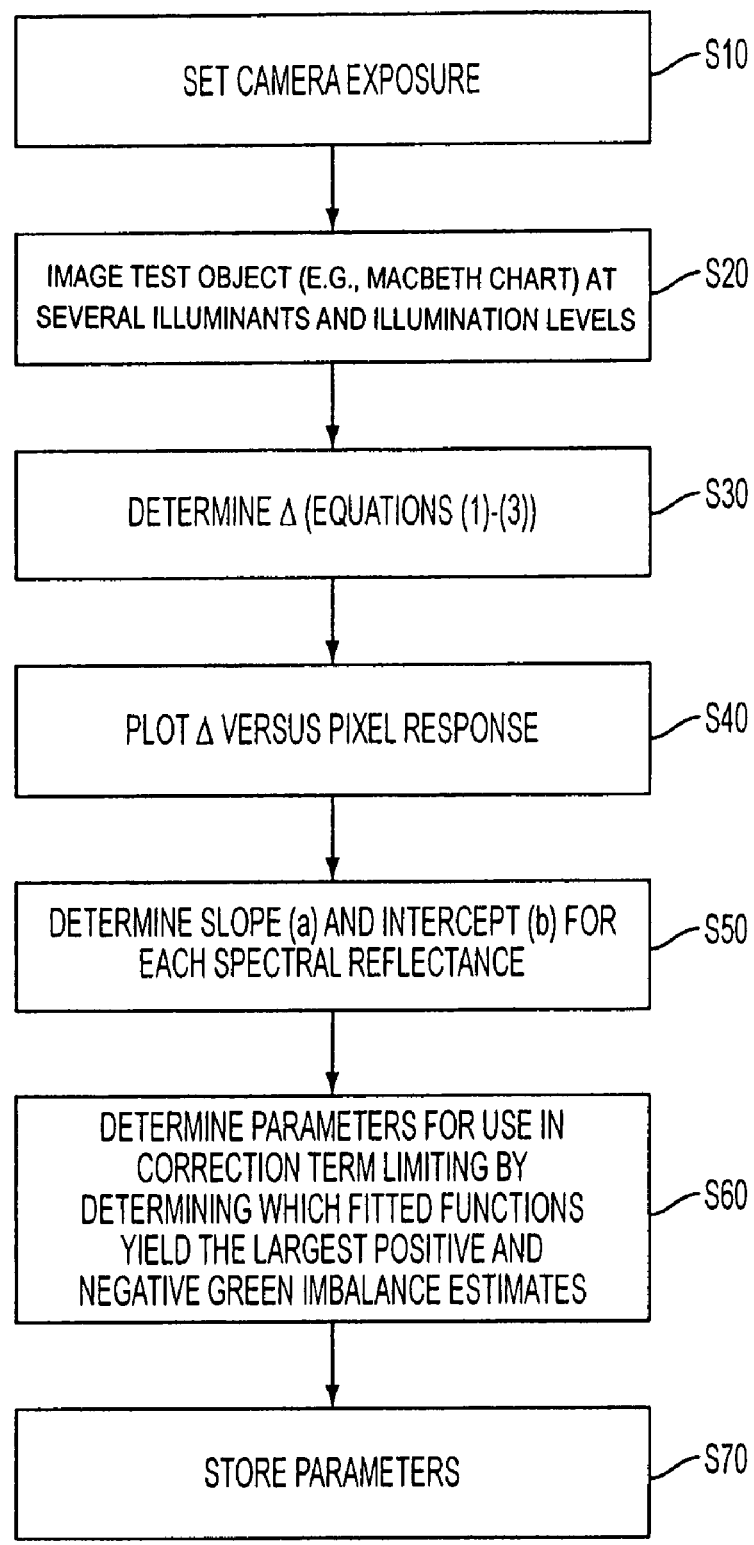
FIG. 4 is a flowchart showing a method of imager calibration in accordance with disclosed embodiments.

A calibration process for an imager wherein the amount of pixel crosstalk is not a function of pixel location in the pixel array is illustrated, in flowchart form, in FIG. 4. This calibration process determines a single set of parameters for use in green balance correction term limiting. At step S10, the camera exposure is set to a fixed value. At step S20, the imager (e.g., a camera) images a test object having all possible spectral reflectances that the designer expects the camera to encounter and image during use. In a typical experiment, the test object would be the known Macbeth color chart; the version for digital cameras having a large collection of patches is preferably used. At step S20, the images are taken using a set of illuminants covering the expected color temperature range of operation, for example at 6500K, 4100K, 3100K and 2800K. In this calibration technique, where it is assumed that pixel location does not effect crosstalk, the placement of the chart is irrelevant because pixel crosstalk is not considered to be a function of pixel location in the array.

The illumination of the Macbeth color chart is increased and the estimated local green balance correction term, $\Delta_{i,j}$, is determined using Equations (1) through (3) at step S30 for each spectral response. The spectral response describes the sensitivity of the photosensor to optical radiation of different wavelengths, i.e., illuminant color temperatures. Then, at step S40, the values of the estimated local green balance correction term, $\Delta_{i,j}$, are plotted against pixel response (calculated as an average of a small local neighborhood) and a linear function is fit to the plotted data. At step S50, the slope, $a_{i,j}$, and offset, $b_{i,j}$, of the linear function are calculated for each spectral response. For the Macbeth chart, the set of spectral responses is determined by the product of the set of patches on the Macbeth chart and the set of illuminants used to take test images. At step S60, the parameters, $a_{neg}$, $b_{neg}$, $a_{pos}$, and $b_{pos}$, are determined, from the set of linear functions, by determining positive and negative limit functions. The positive limit function may be a linear function $f_{pos}(p)=a_{pos}*p+b_{pos}$ such that $f_{pos}(p)$ always equals or exceeds values of all estimated positive limit functions for all pixel values p. Similarly, the negative function is a linear function $f_{neg}(p)=a_{neg}*p+b_{neg}$ such that $f_{neg}(p)$ is always less than or equal to all estimated negative limit functions for all pixel values p. The parameters are calculated as shown in Equations (11) and (12), respectively:

$a_{neg}$ and $b_{neg}$, such that $a_{neg}*p+b_{neg} \leq a_{neg\_i,j}*p+b_{neg\_i,j}$ for all values of $i,j$ and $p$, while minimizing the overall aggressiveness of green imbalance correction by, for example, minimizing sum $(|a_{neg}*p+b_{neg}|)$ for all p; (11)

$a_{pos}$ and $b_{pos}$ are minimum, such that $a_{pos}*p+b_{pos} \geq a_{pos\_i,j}*p+b_{pos\_i,j}$ for all values of $i$, $j$ and $p$, while minimizing the overall aggressiveness of green imbalance correction by, for example, minimizing sum$(|a_{pos}*p+b_{pos}|)$ for all $p$. (12)

The determined parameters are then stored at step S70 for later use in determining the limits on the green balance compensation terms during image processing. Alternatively, other parameters for defining piecewise non-linear equations from which the determined parameters can be calibrated could be stored.

Figure 5:
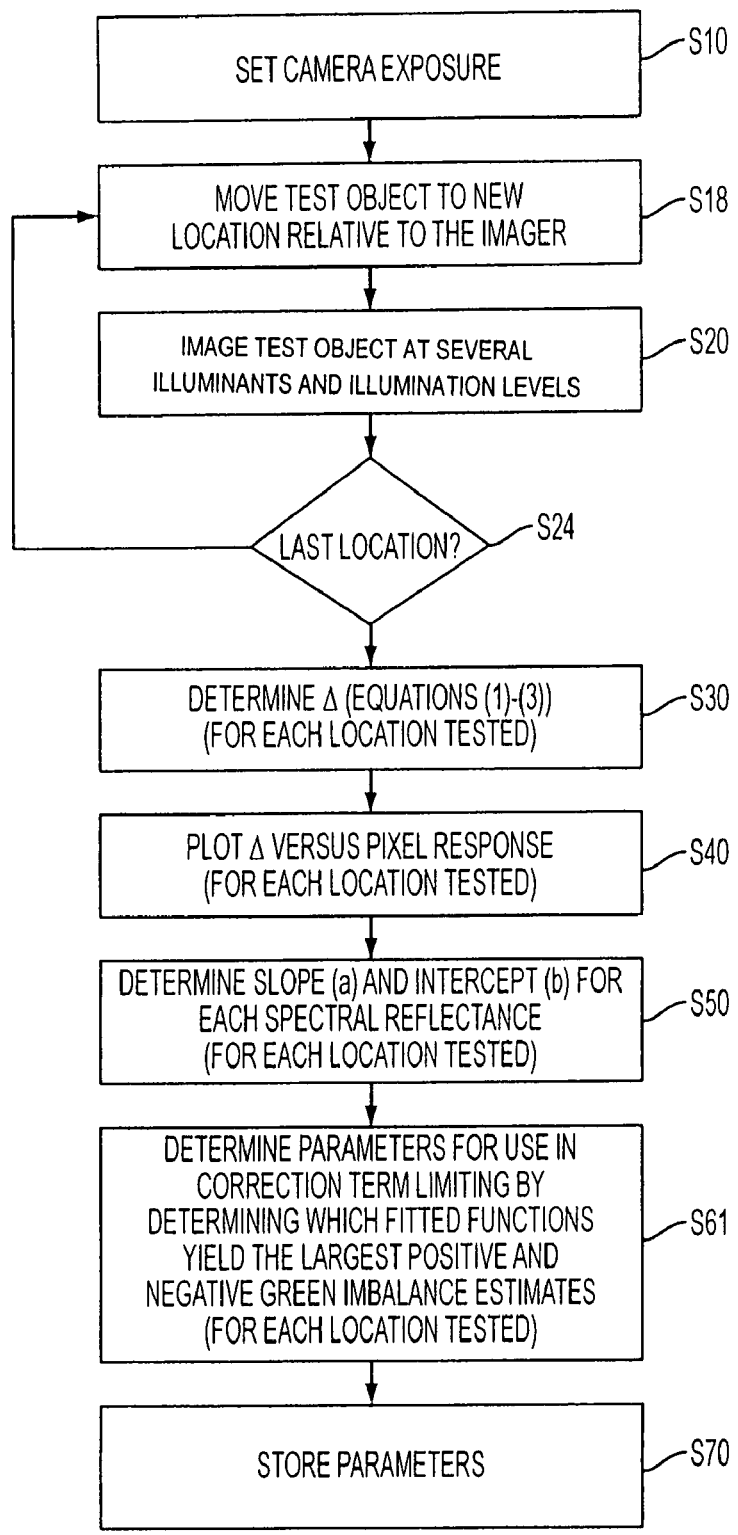
FIG. 5 is a flowchart showing an additional method of imager calibration in accordance with disclosed embodiments.

A calibration process for an imager pixel array wherein the amount of pixel crosstalk is a function of pixel location in the pixel array is illustrated, in flowchart form, in FIG. 5. This calibration process determines a set of parameters ($a_{neg\_i,j}$, $b_{neg\_i,j}$, $a_{pos\_i,j}$, and $b_{pos\_i,j}$) for each pixel location (i, j) for use in limiting a green balance correction term. The steps with the same reference numerals in FIG. 5 are performed in the same manner as described with reference to FIG. 4 above. FIG. 5 includes the additional steps of moving the test object to a new location relative to the scene imaged by the imager (step S18) and repeating steps S18 through S20 until the last location has been imaged (step S24). The test object, e.g., the Macbeth color chart, is placed in a variety of locations to be imaged, such as corners, sides and imager center. A plurality of sets of parameters ($a_{neg\_i,j}$, $b_{neg\_i,j}$, $a_{pos\_i,j}$, and $b_{pos\_i,j}$) are determined at step S61 (using Equations (11) and (12)), with one set being calculated for each of the locations at which the Macbeth color chart is placed.

The parameters are stored at step S70 for later use during image processing. Alternatively, parameters can be stored which are capable of generating piecewise non-linear equations which define the green imbalance correction parameters can be stored. In theory, for implementations in which the pixel location affects the green imbalance correction, a set of parameters can be determined and stored for each green pixel location in the pixel array. However, in practical implementations, the parameters may be stored in the form of a table specifying values only in several points, for example, for array corners, sides and center. Values for remaining locations may then be determined using bi-linear interpolation.

Alternatively, the parameters could be set to a constant equal to their maximum positive and negative values across the entire array to substantially simplify implementation. However, using this method will result in the correction terms not being limited in an optimal way in certain areas in the array.

The parameters could also be set using a combination of these methods. A window is defined which covers the image center ($x_0$, $y_0$, $x_1$, $y_1$). Within this window, the parameters, $a_{neg}$, $b_{neg}$, $a_{pos}$, and $b_{pos}$, are constant. Outside of the window (e.g., toward the image periphery), the parameters will increase as a function of the distance from the window, e.g., $a_{pos}=a_{pos}+$depth pos (dx, dy). This method of parameter setting is based on the observation that green imbalance is typically strongest on the image periphery, and therefore more correction is required at those locations. Two methods of calculation of $da_{pos}(dx, dy)$ are shown in Equations (13) and (14). It should be noted that the same approach is taken with the other three parameters, $a_{neg}$, $b_{neg}$, and $b_{pos}$.

$$da_{pos}(dx,dy)=da_{pos\_x}*dx+da_{pos\_y}*dy. \quad (13)$$

$$da_{pos}(dx,dy)=\max(da_{pos\_x}*dx+da_{pos\_y}*dy). \quad (14)$$

where $dx=x_0-x$ when $x<x_0$; $dx=x-x_1$ when $x>x_1$; $dy=y_0-y$ when $y<y_0$; $dy=y-y_1$ when $y>y_1$; for each of Equations (13) and (14).

Figure 6:
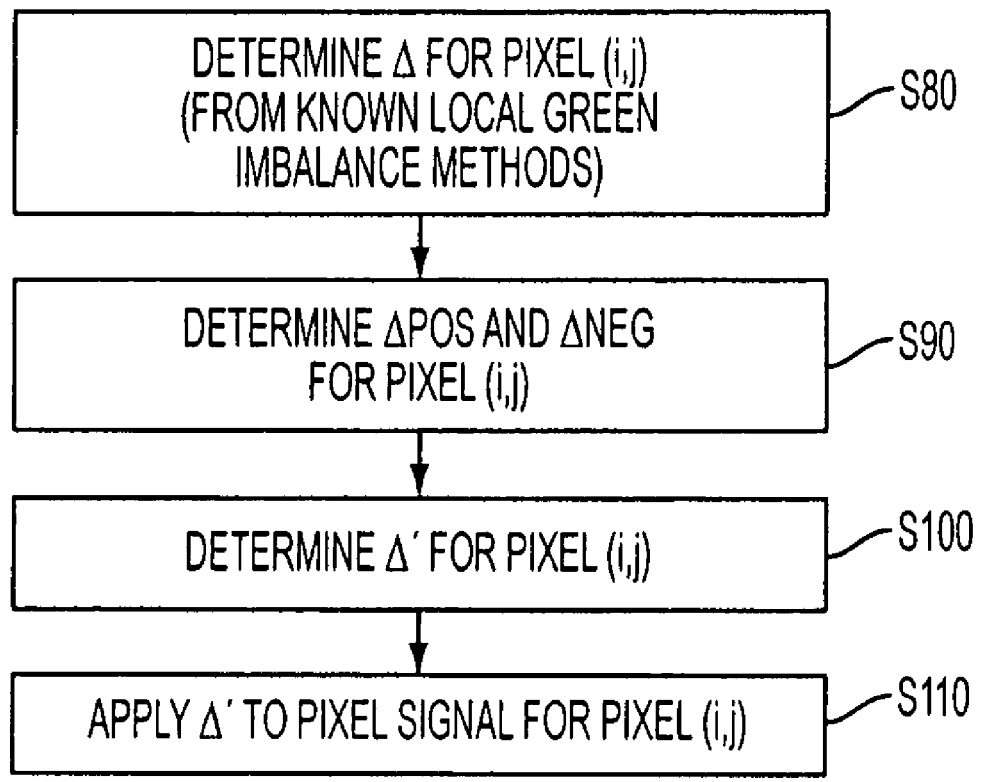
FIG. 6 is a flowchart showing a method for performing green imbalance compensation in accordance with disclosed embodiments.
Figure 7:
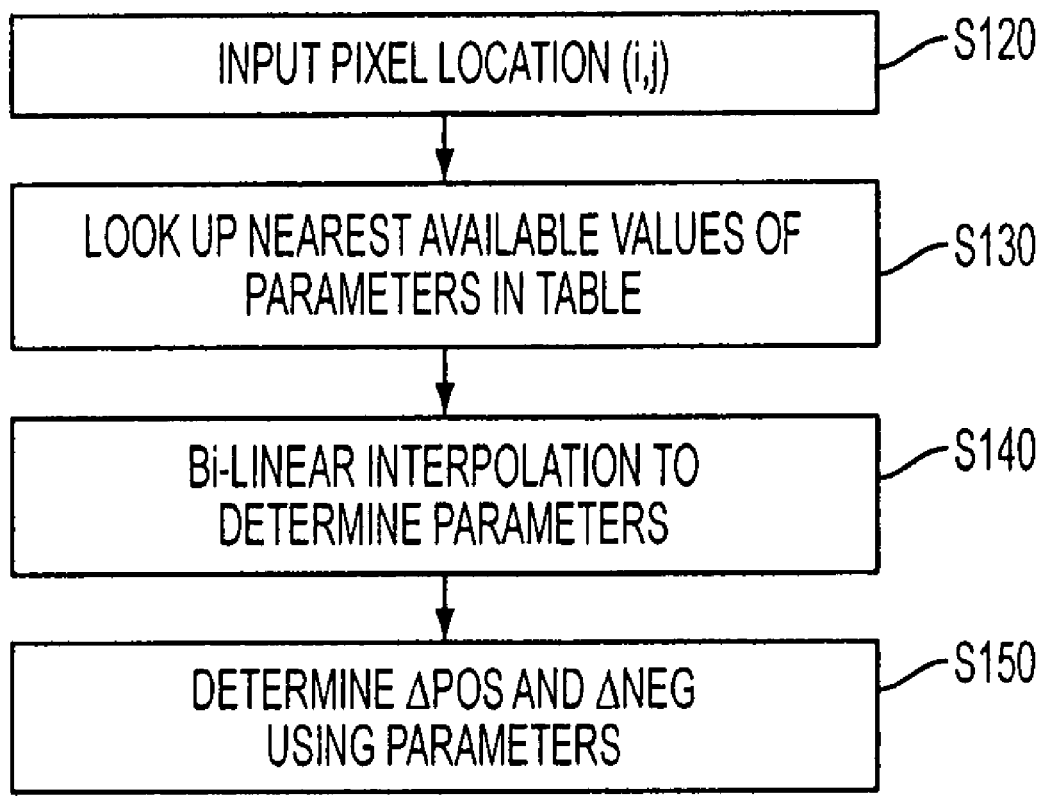
FIG. 7 is a flowchart showing a method for determining correction term limits in accordance with disclosed embodiments.
Figure 8:
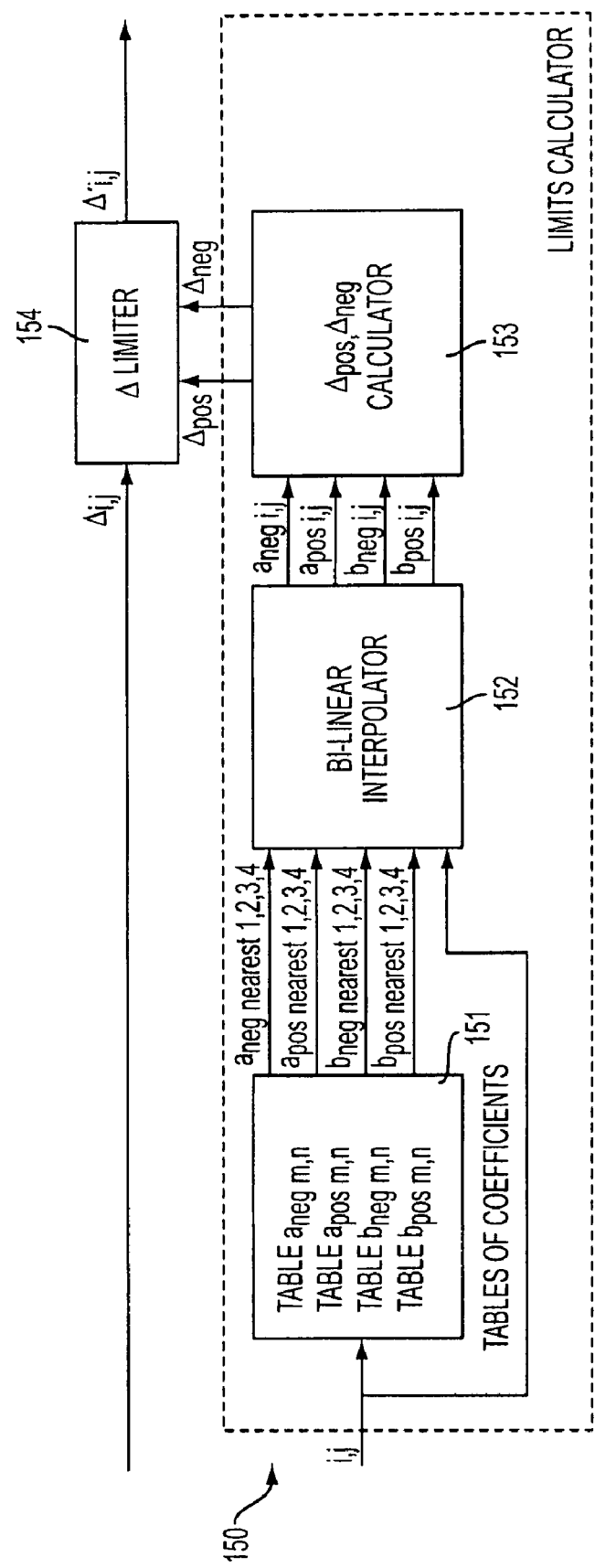
FIG. 8 is a block diagram of a limits calculator of disclosed embodiments.

Once the imager has been calibrated, the stored parameters are used during image processing to implement green imbalance compensation on the green pixels of the captured image. FIG. 6 shows a method of green imbalance compensation in accordance with disclosed embodiments. FIG. 7 illustrates a method for determining the positive and negative limits, $\Delta_{pos}$ and $\Delta_{neg}$, of the correction term. FIG. 8 illustrates a system that implements the method of FIGS. 6 and 7.

Referring to FIG. 6, at step S80, the estimated local green balance correction term, $\Delta_{i,j}$, is determined in accordance with any known method. Then at step S90, the upper and lower limits, $\Delta_{pos\_i,j}$ and $\Delta_{neg\_i,j}$, of the correction term are determined. It is important to note that the limited correction term may be the same as the estimated local green balance correction term when the local estimated green balance correction term is already within the predetermined limits, as previously discussed. At step S100, the limited green balance correction term, $\Delta'_{i,j}$, is determined. Then, at step S110, limited green balance correction term, $\Delta'_{i,j}$, is applied to the pixel signal. This may be done in the limiter 154 of FIG. 8.

In the method of FIG. 7, a plurality of parameter sets have been determined and stored for various locations throughout the array, as discussed above with reference to FIG. 5. At step S120, the pixel location (i, j) for a green pixel for which crosstalk is to be corrected is input into a limits calculator 150 (FIG. 8). Then, the four nearest available values of the four parameters ($a_{neg\_i,j}$, $b_{neg\_i,j}$, $a_{pos\_i,j}$, and $b_{pos\_i,j}$) surrounding the pixel location are found in the stored tables of parameters 151 at step S130. At step S140, a bi-linear interpolator 152 determines the values of the parameters for the pixel location (i,j). At step S150, $\Delta_{pos\_i,j}$ and $\Delta_{neg\_i,j}$ are determined in a $\Delta_{pos}$, $\Delta_{neg}$ calculator 153 using the parameters determined at step S140 and Equation (10). In this embodiment, $a_{neg}$ is replaced by $a_{neg\_i,j}$, etc. in Equation (10). Parameters $a_{neg\_i,j}$, $b_{neg\_i,j}$, $a_{pos\_i,j}$, and $b_{pos\_i,j}$ have been calibrated for a plurality of pixel locations throughout the array, in accordance with FIG. 5.

FIG. 8 illustrates a hardware implementation of position-dependent correction term limits that includes a limits calculator 150 for calculating position-dependent parameters $a_{neg\_i,j}$, $b_{neg\_i,j}$, $a_{pos\_i,j}$, and $b_{pos\_i,j}$. The parameters determined during imager pixel array calibration (FIGS. 4 and 5) may be stored in table 151. The table has entries denoting values of corresponding parameters as a grid of size K by L, where K is much less than M and L is much less than N. For example, the parameters can be specified for points on a coarse 5×5 grid overlaid on the pixel array instead of specifying values for each pixel, $p_{i,j}$. The parameters for use in limiting the green balance correction term for pixel locations for which the corresponding parameters are not stored may then be calculated by bi-linear interpolation as described with reference to FIG. 7.

Alternatively, the limits, $\Delta_{pos\_i,j}$ and $\Delta_{neg\_i,j}$ of the correction term may be determined using parameters from a look-up table without interpolation or from a single set of parameters (as determined with reference to FIG. 4) or from stored parameters which can be used to generate piecewise non-linear equations which can generate parameters which are in turn used to generate the limits $\Delta_{pos\_i,j}$, and $\Delta_{neg\_i,j}$.

Figure 9:
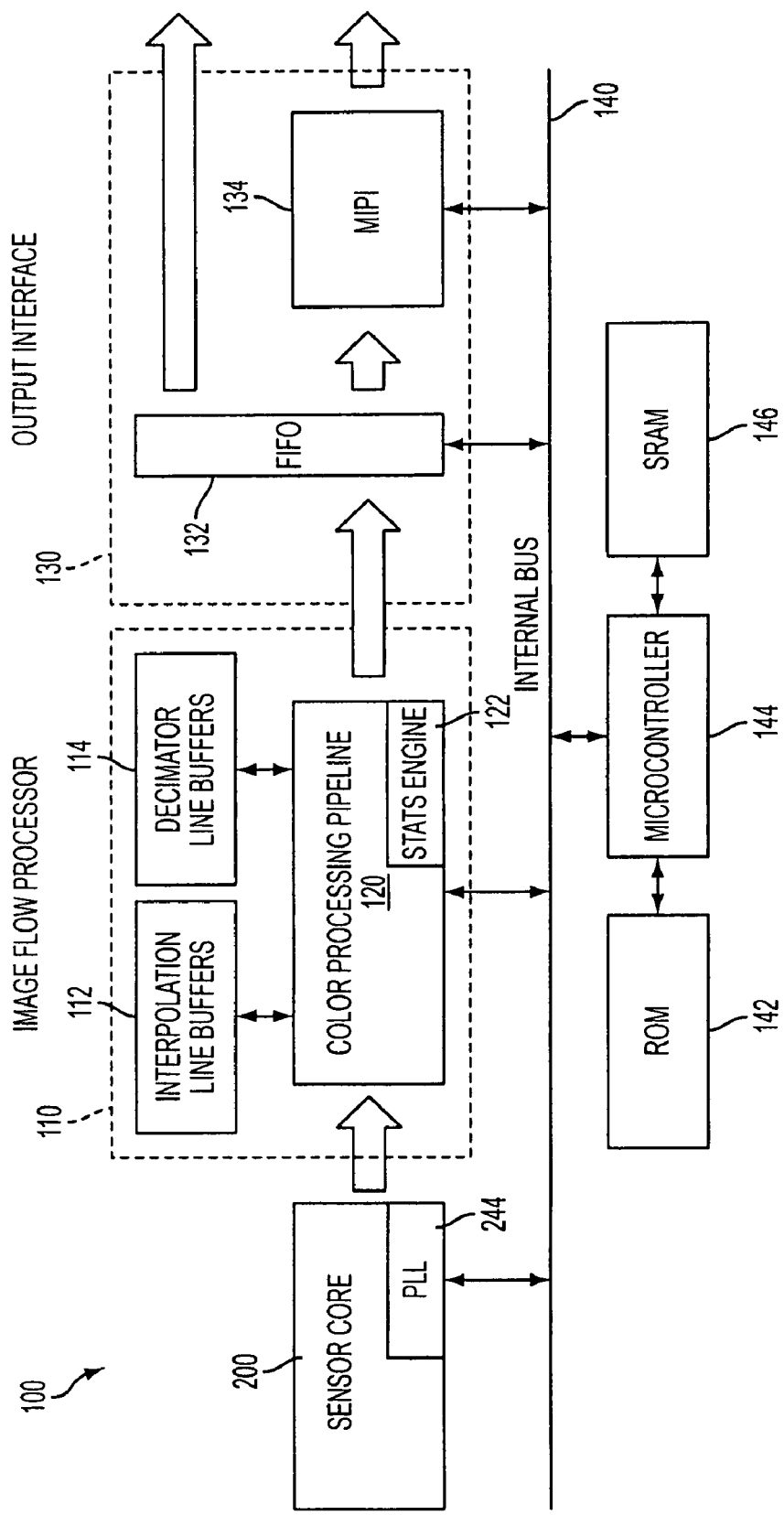
FIG. 9 is a block diagram of a system-on-a-chip imager implementing disclosed embodiments.

FIG. 9 illustrates a block diagram of a system-on-a-chip (SOC) imager 100 which may use any type of image sensing technology, CCD, CMOS, etc and which implements the previously described method.

The imager 100 comprises a sensor core 200 that communicates with an image processor circuit 110 that is connected to an output interface 130. A phase lock loop (PLL) 244 is used as a clock for the sensor core 200. The image processor circuit 110, which is responsible for image and color processing, includes interpolation line buffers 112, decimator line buffers 114, and a color processing pipeline 120. The color processing pipeline 120 includes, among other things, a limits calculator 150 and limiter 154, shown in FIG. 8. One of the functions of the color processing pipeline 120 is the performance of green imbalance compensation in accordance with the embodiments discussed above. The image processor circuit 110 may also be implemented as a DSP or a host computer.

The output interface 130 includes an output first-in-first-out (FIFO) parallel buffer 132 and a serial Mobile Industry Processing Interface (MIPI) output 134, particularly where the imager 100 is used in a camera in a mobile telephone environment. The user can select either a serial output or a parallel output by setting registers in a configuration register within the imager 100 chip. An internal bus 140 connects read only memory (ROM) 142, a microcontroller 144, and a static random access memory (SRAM) 146 to the sensor core 200, image processor circuit 110, and output interface 130. The read only memory (ROM) 142 or SRAM 146 may serve as a storage location for one or more sets of stored parameter values (e.g., $a_{neg\_i,j}$, $b_{neg\_i,j}$, $a_{pos\_i,j}$, and $b_{pos\_i,j}$), or for parameters describing a piecewise non-linear equation from which these values can be derived.

Figure 10:
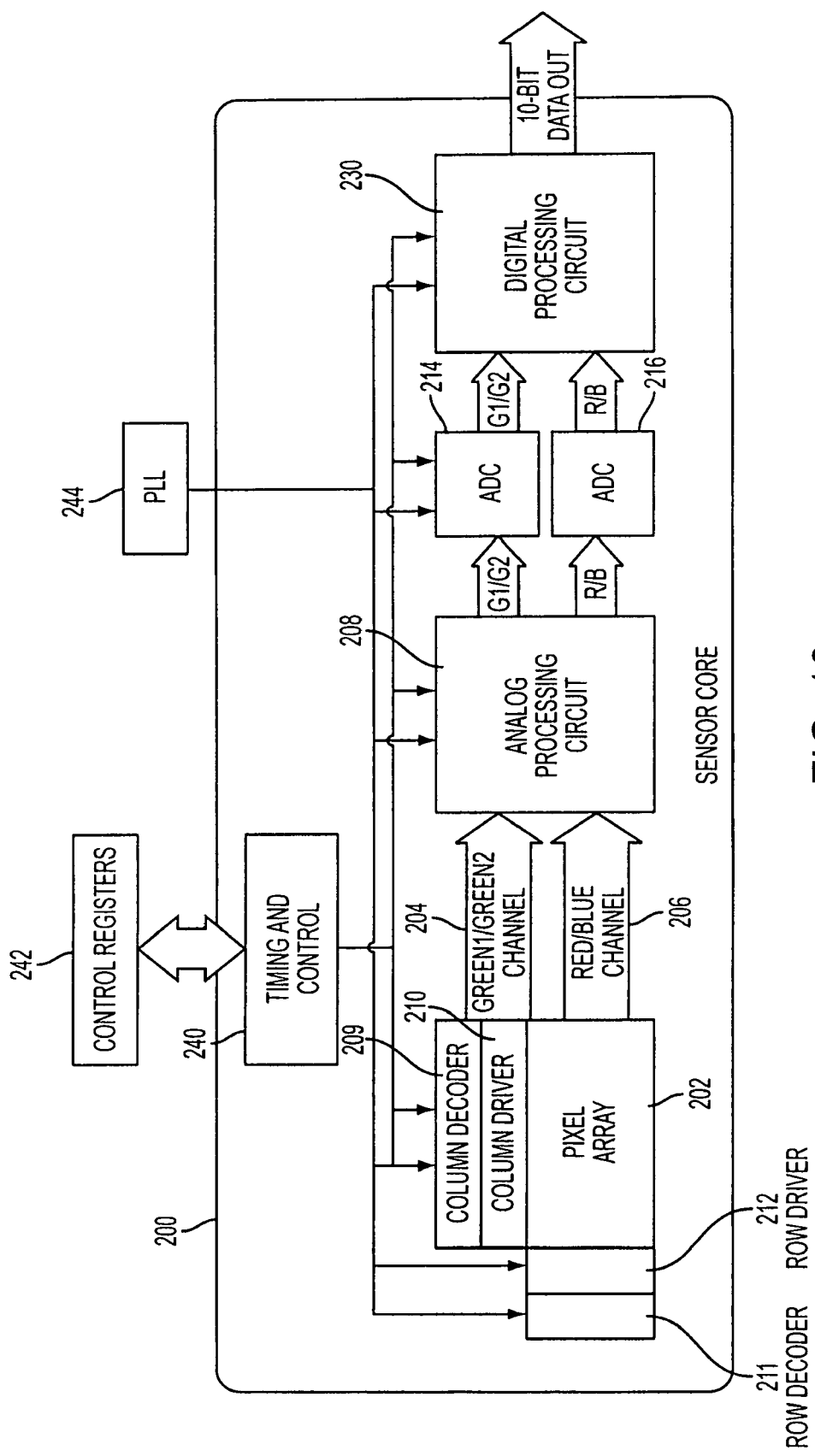
FIG. 10 is an example of a sensor core used in the FIG. 9 imager.

FIG. 10 illustrates a sensor core 200 that may be used in the imager 100 (FIG. 9). The sensor core 200 includes, in one embodiment, a pixel array 202. Pixel array 202 is connected to analog processing circuit 208 by a green1/green2 channel 204, which outputs pixel output signals corresponding to two green channels of the pixel array 202, and through a red/blue channel 206, which contains pixel output signals corresponding to the red and blue channels of the pixel array 202.

Although only two channels 204, 206 are illustrated, there are effectively two green channels, green-red and green-blue, as well as red and blue channels. The green1 (i.e., green-red) and green2 (i.e., green-blue) signals are read out at different times (using channel 204) and the red and blue signals are read out at different times (using channel 206). The analog processing circuit 208 outputs processed green1/green2 signals G1/G2 to a first analog-to-digital converter (ADC) 214 and processed red/blue signals R/B to a second analog-to-digital converter 216. The outputs of the two analog-to-digital converters 214, 216 are sent to a digital processing circuit 230.

Connected to, or as part of, the pixel array 202 are row and column decoders 211, 209 and row and column driver circuitry 212, 210 that are controlled by a timing and control circuit 240 to capture images using the pixel array 202. The timing and control circuit 240 uses control registers 242 to determine how the pixel array 202 and other components are controlled. As set forth above, the PLL 244 serves as a clock for the components in the sensor core 200.

The pixel array 202 comprises a plurality of pixels arranged in a predetermined number of columns and rows. For a CMOS imager, the pixels of each row in the pixel array 202 are all turned on at the same time by a row select line and the pixels of each column within the row are selectively output onto column output lines by a column select line. A plurality of row and column lines are provided for the entire pixel array 202. The row select lines are selectively activated by row driver circuitry 212 in response to row decoder 211 and column select lines are selectively activated by a column driver 210 in response to column decoder 209. Thus, a row and column address is provided for each pixel. The timing and control circuit 240 controls the row and column decoders 211, 209 for selecting the appropriate row and column lines for pixel readout, and the row and column driver circuitry 212, 210, which apply driving voltage to the drive transistors of the selected row and column lines.

Each column contains sampling capacitors and switches in the analog processing circuit 208 that read a pixel reset signal Vrst and a pixel image signal Vsig for selected pixels. Because the sensor core 200 uses a green1/green2 channel 204 and a separate red/blue channel 206, analog processing circuit 208 will have the capacity to store Vrst and Vsig signals for green1/green2 and red/blue pixel output signals. A differential signal (Vrst−Vsig) is produced by differential amplifiers contained in the analog processing circuit 208. This differential signal (Vrst−Vsig) is produced for each pixel output signal. Thus, the signals G1/G2 and R/B are differential signals representing respective pixel output signal values that are digitized by a respective analog-to-digital converter 214, 216. The analog-to-digital converters 214, 216 supply the digitized G1/G2 and R/B pixel output signals to the digital processing circuit 230 which forms the digital image output (for example, a 10 bit digital output). The output is sent to the image processor circuit 110 (FIG. 9) for further processing. The image processor circuit 110 will, among other things, perform a green imbalance compensation on the digital pixel output signal values of the captured image. Although a CMOS sensor core has been described for providing pixels output signals of a captured image, other solid state imager sensor core architectures and readout devices, such as CCD and others, may also be used.

The color processing pipeline 120 of the image processor circuit 110 performs a number of operations on the pixel output signals received thereat. In accordance with embodiments described herein, the green imbalance compensation may be performed using a set of stored parameters available in, for example, ROM 142, SRAM 146 or other forms of storage (e.g., registers).

A software implementation of determining the correction term limits may also be used. The software implementation would be functionally identical to the hardware implementation except that it is written on executable code stored on a memory medium and executed by a processor.

As previously discussed, embodiments may be implemented as part of a pixel output signal processing pipeline 110 by a processor executing a program, by hardware circuits within processing pipeline 110, or by a combination of the two, or by a stand-alone processing system.

Embodiments may be implemented as part of a camera such as e.g., a digital still or video camera, or other image acquisition system, and also may be implemented as a stand-alone or plug-in software component for use in image editing applications. In such applications, the process described above with reference to FIGS. 4-7 can be implemented as computer instruction code stored as a set of instructions on a storage medium and executable on a processor. The stored parameters are contained on a storage medium for use in a computer image processing system.

Figure 11:
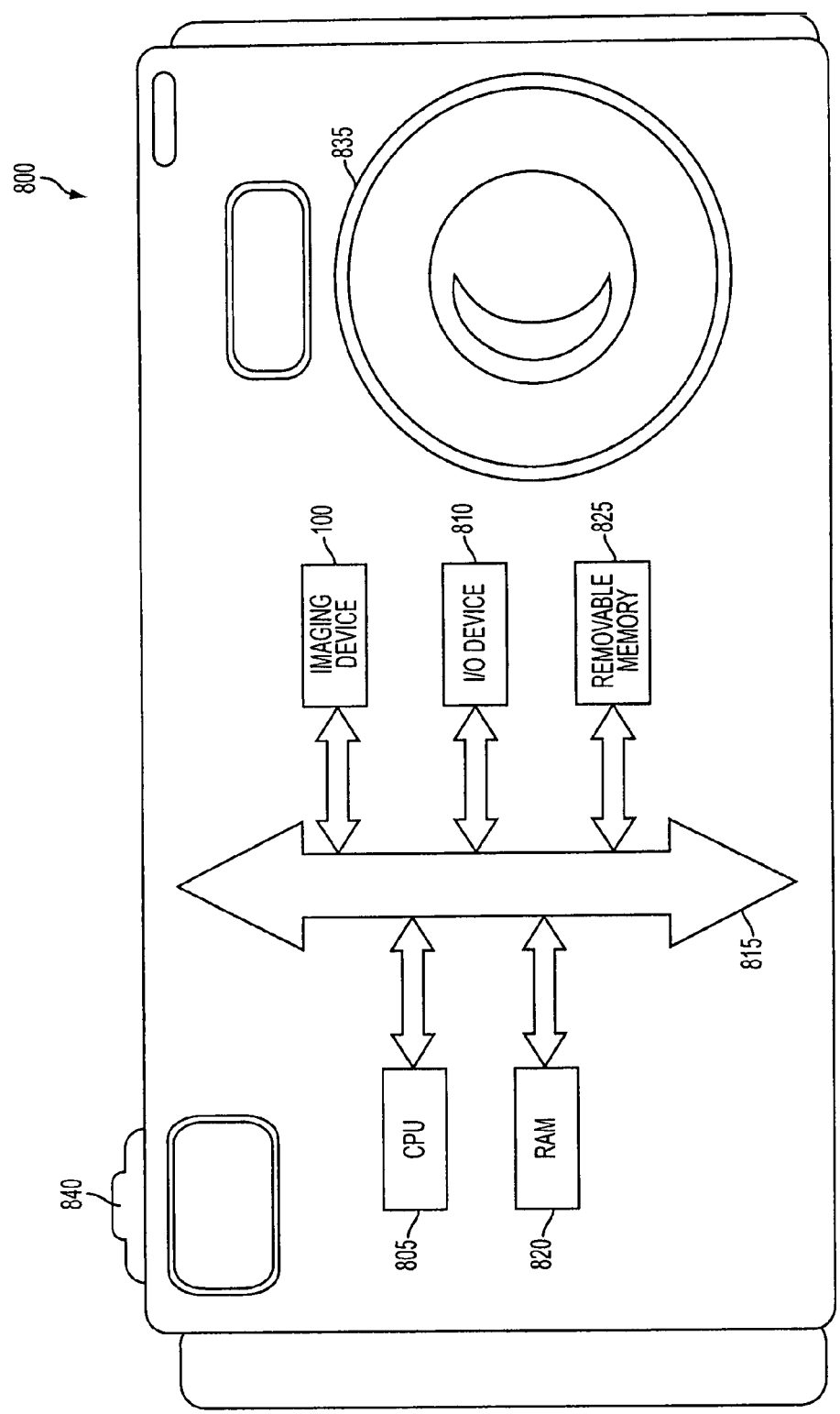
FIG. 11 is a processing system, for example, a digital still or video camera system, constructed in accordance with disclosed embodiments.

FIG. 11 illustrates a processor system as part of, for example, or digital still or video camera system 800 employing a system-on-a-chip imager 100 as illustrated in FIG. 8, which imager 100 provides for green imbalance compensation and other pixel output signal corrections as described above. The processing system includes a processor 805 (shown as a CPU) which implements system, e.g. camera 800, functions and also controls image flow. The processor 805 is coupled with other elements of the system, including random access memory 820, removable memory 825 such as a flash or disc memory, one or more input/out devices 810 for entering data or displaying data and/or images and imager 100 through bus 815 which may be one or more busses or bridges linking the processor system components. Camera 800 further includes a lens 835 that allows light to pass to the imager 100 when shutter release button 840 is activated.

The camera system 800 is an example of a processing system having digital circuits that could include imagers. Without being limiting, such a system could include a computer system, camera system, scanner, machine vision, vehicle navigation, video phone, surveillance system, auto focus system, star tracker system, motion detection system, image stabilization system, and after image processing system.

While described embodiments have been described in detail, it should be readily understood that the invention is not limited to the disclosed embodiments. Rather the embodiments can be modified to incorporate any number of variations, alterations, substitutions or equivalent arrangements not heretofore described.

What is claimed as new and desired to be protected by Letters Patent of the United States:

1. A method of processing a plurality of pixel signals corresponding to an image comprising:
   determining an estimated green balance correction term for each green pixel signal;
   determining a limited green balance correction term for each green pixel signal by limiting the estimated green balance correction term based on a set of parameters; and
   adjusting each green pixel signal by applying the limited green balance correction term to the green pixel signal.

2. The method of claim 1, wherein limiting the estimated green balance correction term further comprises applying at least one of an upper limit and a lower limit to the estimated green balance correction term, wherein the upper and lower limits are determined from the set of parameters.

3. The method of claim 1 wherein the set of parameters is obtained from a storage location that includes a plurality of sets of parameters, respectively associated with different ones of the plurality of green pixel signals.

4. The method of claim 1 wherein determining the estimated green balance correction term further comprises:
   determining a first average of pixel signals in a pixel kernel surrounding a particular green pixel being processed and belong to a first green color channel, wherein the particular pixel belongs to the first green color channel;
   determining a second average of pixel signals in a pixel kernel surrounding the particular green pixel and belong to a second green color channel; and
   determining the estimated green balance correction term based on a difference between the first average and the second average.

5. The method of claim 4, wherein the estimated green balance correction term is determined as $$\Delta_{i,j} = \frac{S_{G1} - S_{G2}}{2},$$

wherein $S_{G1}$ is the first average and $S_{G2}$ is the second average.

6. The method of claim 2, wherein the set of parameters comprises $a_{pos}$, $b_{pos}$, $a_{neg}$, and $b_{neg}$ and are stored in a storage location, wherein $a_{pos}$ and $a_{neg}$ are the slope and $b_{pos}$ and $b_{neg}$ are the intercepts of functions determined during a calibration procedure and the parameters are related to at least one of the particular pixel signal, a sensor which captures the image and camera optics of a camera which captures the image,
   wherein the upper and lower limits are determined by applying the set of parameters as follows:

$\Delta_{pos} = a_{pos} * p_{i,j} + b_{pos}$; and $\Delta_{neg} = a_{neg} * p_{i,j} + b_{neg}$, and wherein $\Delta_{pos}$ is the upper limit, $\Delta_{neg}$ is the lower limit and $p_{i,j}$ is a particular pixel signal.

7. The method of claim 4, wherein adjusting the pixel signals further comprises applying the limited local green balance correction term to each green pixel signal as follows:
   $p'_{i,j} = p_{i,j} - |\Delta_{i,j}|$, when the first average is greater than the second average;

$p'_{i,j}=p_{i,j}+|\Delta_{i,j}|$, when the first average is less than the second average; and $p'_{i,j}=p_{i,j}$, when the first average is equal to the second average, wherein $p'_{i,j}$ is the adjusted pixel signal, $p_{i,j}$ is a particular pixel signal, $\Delta_{i,j}$ is the limited local green balance correction term, and i and j represent a location of the particular green pixel within a pixel array.

8. The method of claim 1 wherein the set of parameters is related to at least one of an array location of a particular green pixel signal, a sensor which captures the image and camera optics of a camera which captures the image.

9. The method of claim 1, wherein the set of parameters is obtained by:
   obtaining from a storage location, for each parameter, a set of available values associated with an array location nearest a particular green pixel being adjusted; and
   using interpolation to determine each parameter for the particular green pixel being adjusted.

10. The method of claim 9 wherein the interpolation is a bi-linear interpolation.

11. A method of operating an imaging system, the method comprising:
    acquiring a plurality of test images;
    developing parameters for limiting green imbalance color correction terms from the test images; and
    storing the parameters in an imager for use in correction of green color imbalance by the imager.

12. The method of claim 11, wherein the plurality of test images are acquired for at least one of a respective plurality of different color temperature illumination conditions and a respective plurality of locations relative to an imager array.

13. The method of claim 11 wherein the plurality of test images are acquired of a test object including a plurality of colors.

14. The method of claim 11, wherein developing the parameters further comprises:
    determining an estimated local green balance correction term for each test image;
    determining data points for the estimated local green balance correction term with respect to a pixel response for each test image;
    fitting a linear function to the data points for each test image;
    determining sets of possible parameters for each test image; and
    choosing the appropriate set of parameters for use in correction term limiting for each test image.

15. The method of claim 14, wherein determining sets of possible parameters for each test image comprises determining a slope and an intercept of the linear function fitted to the data points for each test image.

16. The method of claim 14, wherein choosing the appropriate set of possible parameters for use in correction term limiting comprises choosing the sets of possible parameters which yield the largest positive and the largest negative green imbalance estimate.

17. The method of claim 11, further comprising storing a plurality of appropriate sets of parameters for use in correction term limiting, wherein each of the plurality of sets of parameters relates to a particular pixel location within a pixel array.

18. An imaging device comprising:
    an array of pixels for capturing an image and providing pixel signals;
    a storage device for storing at least one set of parameters; and
    a processing circuit for processing pixel output signals produced by the array and corresponding to a captured image, the processing circuit being configured to:
        determine an estimated green balance correction term for each green pixel output signal;
        determine a limited green balance correction term for each green pixel output signal by limiting the estimated green balance correction term by applying at least one of an upper limit and a lower limit to the estimated green balance correction term, wherein the upper and lower limits are determined from the at least one set of parameters; and
        adjust each green pixel output signal by applying the limited green balance correction term to the green pixel signal.

19. The imaging device of claim 18, wherein the set of parameters comprises $a_{pos}$, $b_{pos}$, $a_{neg}$, and $b_{neg}$ and are stored in a storage location, wherein $a_{pos}$ and $a_{neg}$ are the slope and $b_{pos}$, and $b_{neg}$ are the intercepts of functions determined during a calibration procedure and the parameters are related to at least one of the particular green pixel signal, a sensor which captures the image and camera optics of a camera which captures the image, wherein determining the upper and lower limits comprises applying the set of parameters as follows:

$$\Delta_{pos}=a_{pos}*p_{i,j}+b_{pos}; \text{ and}$$

$$\Delta_{neg}=a_{neg}*p_{i,j}+b_{neg},$$

and wherein $\Delta_{pos}$ is the upper limit and $\Delta_{neg}$ is the lower limit.

20. The imaging device of claim 18, wherein determining the estimated green balance correction term further comprises:
    determining a first average of pixel output signals in a pixel kernel surrounding a particular green pixel being processed and belong to a first green color channel, wherein the particular green pixel belongs to the first green color channel;
    determining a second average of pixel output signals in a pixel kernel surrounding the particular green pixel and belong to a second green color channel; and
    determining the estimated green balance correction term based on a difference between the first average and the second average.

21. The imaging device of claim 20, wherein adjusting the pixel output signals further comprises applying the limited green balance correction term to the green pixel output signal as follows:

$p'_{i,j}=p_{i,j}-|\Delta_{i,j}|$, when the first average is greater than the second average;

$p'_{i,j}=p_{i,j}+|\Delta_{i,j}|$, when the first average is less than the second average; and $p'_{i,j}=p_{i,j}$, when the first average is equal to the second average, wherein $p'_{i,j}$ is the adjusted pixel signal, $p_{ij}$ is a particular green pixel output signal, $\Delta_{ij}$ is the limited local green balance correction term, and i and j represent a location of the particular green pixel within the array of pixels.

22. The imaging device of claim 18, wherein the set of parameters is obtained by:
    obtaining from a storage location, for each parameter, a set of available values associated with an array location nearest a particular green pixel being adjusted; and
    using interpolation to determine the set of parameters for the green particular pixel being adjusted.

23. A digital camera comprising:
a pixel array for capturing an image received through a lens;
a storage area for storing at, least one set of parameters; and
a pixel array processing circuit which, using the at least one set of parameters, is configured to determine a limited green balance correction term, and to adjust green pixel signals for a captured image using the limited green balance correction term, wherein the limited green balance correction term is determined by limiting an estimated green balance correction term using the at least one set of parameters, and wherein the estimated green balance correction term is limited such that the limited green balance correction term is greater than or equal to a lower limit and less than or equal to an upper limit, wherein the lower and upper limits are determined from the at least one set of parameters.

24. The digital camera of claim 23, wherein the set of parameters comprises $a_{pos}$, $b_{pos}$, $a_{neg}$, and $b_{neg}$ and is stored in a storage location, wherein $a_{pos}$ and $a_{neg}$ are the slope and $b_{pos}$ and $b_{neg}$ are the intercepts of functions determined during a calibration procedure and the parameters are related to at least one of the particular green pixel signal, a sensor which captures the image and camera optics of a camera which captures the image, wherein the upper and lower limits are determined by applying the set of parameters as follows:

$$\Delta_{pos} = a_{pos} * p_{i,j} + b_{pos}; \text{ and}$$

$$\Delta_{neg} = a_{neg} * p_{i,j} + b_{neg},$$

wherein $\Delta_{pos}$ is the upper limit, $\Delta_{neg}$ is the lower limit and $P_{i,j}$ is the green pixel signal.

25. A non-transitory computer readable medium having stored thereon a computer program comprising a set of instructions executed by a computer to implement a method for green imbalance correction, the method comprising the acts of:

determining an estimated green balance correction term for each green pixel signal associated with a captured image, wherein determining the estimated green balance correction term comprises:

determining a first average of pixel signals in a pixel kernel surrounding a particular green pixel being processed and belong to a first green color channel, wherein the particular pixel belongs to the first green color channel;

determining a second average of pixel signals in a pixel kernel surrounding the particular green pixel and belong to a second green color channel; and determining the estimated green balance correction term based on a difference between the first average and the second average;

determining a limited green balance correction term for each green pixel signal by limiting the estimated green balance correction term by applying at least one of an upper limit and a lower limit to the estimated green balance correction term, wherein the upper and lower limits are determined from a set of parameters, the set of parameters being related to at least one of an array location of a particular green pixel signal, a sensor which captures the image and camera optics of a camera which captures the image, and the set of parameters being obtained by:

obtaining from a storage location, for each parameter, a set of available values associated with an array location nearest the particular green pixel being adjusted; and using interpolation to determine the set of parameters for the green particular pixel being adjusted; and adjusting each green pixel signal by applying the limited green balance correction term to the green pixel signal.

* * * * *